United States Patent
Graf et al.

(10) Patent No.: US 10,874,569 B2
(45) Date of Patent: Dec. 29, 2020

(54) DEVICE AND METHOD FOR CONTROLLING AT LEAST ONE DRIVE MECHANISM OF AN OPERATING TABLE

(71) Applicant: MAQUET GMBH, Rastatt (DE)

(72) Inventors: Heiko Graf, Wörth (DE); Matthias Jörger, Achern (DE); Winfried Wild, Karlsruhe (DE)

(73) Assignee: MAQUET GMBH, Rastatt (DE)

( * ) Notice: Subject to any disclaimer, the term of this patent is extended or adjusted under 35 U.S.C. 154(b) by 149 days.

(21) Appl. No.: 15/768,474

(22) PCT Filed: Aug. 9, 2016

(86) PCT No.: PCT/EP2016/068972
§ 371 (c)(1),
(2) Date: Apr. 13, 2018

(87) PCT Pub. No.: WO2017/025541
PCT Pub. Date: Feb. 16, 2017

(65) Prior Publication Data
US 2018/0296418 A1    Oct. 18, 2018

(30) Foreign Application Priority Data
Aug. 10, 2015    (DE) .................. 10 2015 113 110

(51) Int. Cl.
*A61G 13/02*          (2006.01)
*G05B 19/042*         (2006.01)

(52) U.S. Cl.
CPC .......... *A61G 13/02* (2013.01); *G05B 19/0428* (2013.01); *A61G 2203/12* (2013.01); *A61G 2203/72* (2013.01); *G05B 2219/23051* (2013.01)

(58) Field of Classification Search
CPC .... A61G 7/018; A61G 13/02; A61G 2203/12; A61H 2201/0142; G05B 15/02; G05B 19/4061; G05B 2219/35316; G05B 19/416
See application file for complete search history.

(56) References Cited

U.S. PATENT DOCUMENTS 4,472,780 A * 9/1984 Chenoweth .......... G05D 1/0077
244/194
4,722,576 A * 2/1988 Matsuda ............... B60T 8/4291
303/116.1
(Continued)

FOREIGN PATENT DOCUMENTS

CN     1743148 A    3/2006
CN     102473004 A   5/2012
(Continued)

OTHER PUBLICATIONS

Japanese Office Action (with English translation) dated Dec. 24, 2019 during the prosecution of corresponding Japanese Patent Application No. 2018-506856, 7 pages.
(Continued)

*Primary Examiner* — Darrin D Dunn

(57) ABSTRACT

A device for controlling at least one drive device of a surgical table, comprising a control unit for making available an output control signal on the basis of at least a first input control signal. The device is configured in such a way that the drive device is controllable with the aid of the output control signal, and that the drive device is directly controllable with the aid of a second input control signal. The device is characterized in that the control unit receives the second input control signal or a signal based on the second input control signal.

17 Claims, 7 Drawing Sheets

(56) References Cited

U.S. PATENT DOCUMENTS

| | | | | |
|---|---|---|---|---|
| 4,841,209 A * | 6/1989 | Poumakis | G05B 9/02 | 318/564 |
| 4,888,707 A * | 12/1989 | Shimada | B25J 9/1666 | 700/255 |
| 5,206,810 A * | 4/1993 | Bools | G05B 9/03 | 318/564 |
| 5,274,554 A * | 12/1993 | Takats | G06F 11/1641 | 244/76 R |
| 5,299,420 A * | 4/1994 | Devier | E02F 9/22 | 60/403 |
| 5,628,078 A | 5/1997 | Pennington et al. | | |
| 5,663,713 A * | 9/1997 | Ironside | B62D 5/0493 | 327/143 |
| 5,745,539 A * | 4/1998 | Lang | G21D 3/04 | 376/259 |
| 5,757,596 A * | 5/1998 | Weber | H02H 7/0833 | 361/115 |
| 5,781,398 A * | 7/1998 | Fenske | B64G 1/24 | 244/169 |
| 5,926,002 A | 7/1999 | Cavanaugh et al. | | |
| 6,365,987 B2 * | 4/2002 | Riederer | B60R 21/0173 | 180/282 |
| 6,448,838 B1 * | 9/2002 | Heim | H03K 5/1515 | 327/365 |
| 7,068,143 B2 * | 6/2006 | Doering | A61G 13/02 | 340/3.1 |
| 7,490,572 B2 * | 2/2009 | Grober | B60R 11/04 | 114/191 |
| 7,506,090 B2 * | 3/2009 | Rudnick | G05B 19/41865 | 710/240 |
| 7,577,502 B1 * | 8/2009 | Henry | B61L 5/102 | 246/218 |
| 7,594,457 B2 * | 9/2009 | Shibui | B23B 1/00 | 82/1.11 |
| 7,847,506 B2 * | 12/2010 | Ogawa | G05B 19/4061 | 318/560 |
| 8,046,116 B2 * | 10/2011 | Rawls-Meehan | A47C 20/041 | 700/302 |
| 8,312,578 B2 * | 11/2012 | L'Hegarat | A61G 13/02 | 180/65.1 |
| 8,392,008 B2 * | 3/2013 | Weatherhead | G06F 9/526 | 700/100 |
| 8,572,778 B2 * | 11/2013 | Newkirk | A61G 7/018 | 5/600 |
| 8,606,379 B2 * | 12/2013 | Marruchella | G05B 19/41835 | 700/86 |
| 8,760,103 B2 * | 6/2014 | Bokusky | G05B 9/02 | 318/563 |
| 8,935,450 B2 * | 1/2015 | Nierop | H04L 12/40045 | 710/110 |
| 9,086,696 B2 * | 7/2015 | Plache | G05B 19/4185 | |
| 9,448,557 B2 * | 9/2016 | Maalioune | F02K 1/763 | |
| 9,873,175 B2 * | 1/2018 | Kasahara | G05B 19/4061 | |
| 9,939,802 B2 * | 4/2018 | Dashevskiy | G05B 19/402 | |
| 9,985,451 B2 * | 5/2018 | Yau | H02J 7/0021 | |
| 9,993,069 B2 * | 6/2018 | Hansen | A47B 9/00 | |
| 10,146,189 B2 * | 12/2018 | Rogers | B66B 13/22 | |
| 2002/0014951 A1 * | 2/2002 | Kramer | A61B 5/0002 | 340/5.8 |
| 2002/0023118 A1 * | 2/2002 | Peled | G06F 9/52 | 718/104 |
| 2003/0009242 A1 * | 1/2003 | Bocchi | G05B 19/4142 | 700/61 |
| 2003/0060909 A1 * | 3/2003 | Yamato | G05B 19/4061 | 700/90 |
| 2003/0063027 A1 * | 4/2003 | Allen, Jr. | B60R 25/102 | 342/357.75 |
| 2003/0090228 A1 * | 5/2003 | Wilkens | G05B 19/4062 | 318/560 |
| 2003/0139177 A1 * | 7/2003 | Doering | A61G 13/02 | 455/420 |
| 2004/0139112 A1 * | 7/2004 | Wickham | G05B 9/02 | |
| 2005/0052083 A1 * | 3/2005 | Hauf | H01H 9/167 | 307/10.1 |
| 2006/0016201 A1 * | 1/2006 | Kopel | G01K 13/00 | 62/129 |
| 2006/0052901 A1 * | 3/2006 | Nihei | B25J 9/1666 | 700/245 |
| 2006/0080777 A1 | 4/2006 | Rocher et al. | | |
| 2006/0150333 A1 * | 7/2006 | Harding | A61G 7/018 | 5/618 |
| 2006/0244408 A1 * | 11/2006 | Feil | H02H 11/00 | 318/782 |
| 2007/0294450 A1 * | 12/2007 | Rudnick | G05B 19/41865 | 710/244 |
| 2008/0018287 A1 * | 1/2008 | Ogawa | G05B 19/4061 | 318/652 |
| 2008/0086221 A1 * | 4/2008 | Ogawa | G05B 19/4061 | 700/17 |
| 2008/0230623 A1 * | 9/2008 | Macnow | F16K 31/46 | 239/11 |
| 2008/0235872 A1 * | 10/2008 | Newkirk | A61G 7/018 | 5/600 |
| 2009/0033624 A1 * | 2/2009 | Rosenberg | A63F 13/285 | 345/161 |
| 2010/0082132 A1 * | 4/2010 | Marruchella | G05B 19/41835 | 700/86 |
| 2010/0082814 A1 * | 4/2010 | Plache | G05B 19/4185 | 709/226 |
| 2010/0084517 A1 * | 4/2010 | Benson | B64C 27/605 | 244/228 |
| 2010/0123987 A1 * | 5/2010 | Pietrzyk | H01H 47/002 | 361/78 |
| 2011/0077968 A1 * | 3/2011 | Kelly | G06Q 10/10 | 705/3 |
| 2011/0205061 A1 * | 8/2011 | Wilson | G05B 19/042 | 340/573.1 |
| 2011/0208541 A1 * | 8/2011 | Wilson | A61G 7/018 | 705/3 |
| 2012/0013452 A1 * | 1/2012 | McNeely | A61G 12/00 | 340/286.07 |
| 2012/0185145 A1 * | 7/2012 | Feuchter | G05B 19/0428 | 701/101 |
| 2012/0243139 A1 * | 9/2012 | Jones | H01H 47/005 | 361/166 |
| 2012/0286588 A1 * | 11/2012 | Steeneken | H01H 59/0009 | 307/115 |
| 2012/0286846 A1 * | 11/2012 | Wunnicke | H01H 59/0009 | 327/403 |
| 2012/0310500 A1 * | 12/2012 | Zimmermann | F16D 48/06 | 701/67 |
| 2013/0021143 A1 | 1/2013 | Collins, Jr. et al. | | |
| 2013/0073761 A1 * | 3/2013 | Nierop | H04L 12/40045 | 710/110 |
| 2013/0085510 A1 * | 4/2013 | Stefanchik | G06F 19/3481 | 606/130 |
| 2013/0131845 A1 * | 5/2013 | Guilleminot | G08C 17/02 | 700/83 |
| 2013/0264890 A1 * | 10/2013 | Le | G05B 9/02 | 307/143 |
| 2013/0285666 A1 * | 10/2013 | Mohtasham | H01H 9/22 | 324/415 |
| 2014/0137025 A1 * | 5/2014 | Newkirk | A61G 7/018 | 715/771 |
| 2014/0187379 A1 * | 7/2014 | Chen | A61B 5/0555 | 477/12 |
| 2014/0343968 A1 * | 11/2014 | Wilson | A61G 7/018 | 705/3 |
| 2014/0351658 A1 * | 11/2014 | D'Ambrosio | G06F 11/3055 | 714/47.2 |
| 2015/0045941 A1 * | 2/2015 | Mitsuhashi | G05B 19/4061 | 700/178 |
| 2015/0238023 A1 * | 8/2015 | Rawls-Meehan | A47C 20/041 | 700/275 |
| 2015/0289672 A1 * | 10/2015 | Rawls-Meehan | A47C 20/041 | 340/12.5 |
| 2015/0336608 A1 * | 11/2015 | Burcar | B62D 6/10 | 701/41 |

(56) References Cited

U.S. PATENT DOCUMENTS

| | | | |
|---|---|---|---|
| 2016/0028263 A1* | 1/2016 | Yau | H02J 7/0021 |
| | | | 320/107 |
| 2016/0095773 A1* | 4/2016 | Ruch | A61G 7/018 |
| | | | 5/616 |
| 2016/0120740 A1* | 5/2016 | Rawls-Meehan | ............ |
| | | | A61H 23/0263 |
| | | | 601/49 |
| 2016/0307429 A1* | 10/2016 | Hood | G08B 3/1016 |
| 2016/0317373 A1* | 11/2016 | Jackson | A61G 13/02 |
| 2016/0328958 A1* | 11/2016 | Ruch | G08C 17/02 |
| 2016/0364981 A1* | 12/2016 | Towers | G08C 17/02 |
| 2017/0064797 A1* | 3/2017 | Thompson | H01H 9/0271 |
| 2017/0079730 A1* | 3/2017 | Azizian | A61B 34/37 |
| 2017/0364424 A1* | 12/2017 | Swanson | G06F 11/2028 |
| 2017/0367577 A1* | 12/2017 | Collins, Jr. | A61B 5/1117 |
| 2018/0008052 A1* | 1/2018 | Krickeberg | A61G 13/02 |
| 2018/0082813 A1* | 3/2018 | Zinser | G05B 9/03 |
| 2018/0104123 A1* | 4/2018 | Newkirk | A61G 7/018 |
| 2018/0193216 A1* | 7/2018 | Soltermann | A61G 13/04 |

FOREIGN PATENT DOCUMENTS

| | | |
|---|---|---|
| DE | 68908664 T2 | 1/1994 |
| DE | 19929907 A1 | 12/2000 |
| EP | 1785119 A1 | 5/2007 |
| JP | H03-500616 A | 2/1991 |
| JP | H05-208036 A | 8/1993 |
| JP | 2004-538037 A | 12/2004 |
| WO | 89/11266 A1 | 11/1989 |
| WO | 96/26615 A1 | 8/1996 |

OTHER PUBLICATIONS

Chinese Office Action (with English translation) dated Jan. 3, 2020 during the prosecution of corresponding Chinese Patent Application No. 201680059189.9, 20 pages.

International Search Report (with English translation) and Written Opinion dated Nov. 2, 2016 issued for PCT/EP2016/068972, 10 pages.

* cited by examiner

DEVICE AND METHOD FOR CONTROLLING AT LEAST ONE DRIVE MECHANISM OF AN OPERATING TABLE

CROSS-REFERENCE TO RELATED APPLICATIONS

The present application is a continuation-in-part filed under 35 U.S.C. § 111(a), and claims the benefit under 35 U.S.C. § 371 of PCT International Application No. PCT/EP2016/068972, filed Aug. 9, 2016, which designates the United States of America, and claims the benefit of German Patent Application No. 10 2015 110.2, filed Aug. 10, 2015. The disclosure of each of these applications is incorporated by reference herein in its entirety.

FIELD OF DISCLOSURE

The invention relates to a device and a method for controlling at least one drive device of a surgical table. The device is configured in such a way that the drive device is directly controllable with the aid of an operating unit.

BACKGROUND

From prior art, an "override" (priority) operating unit for surgical tables is known, which is firmly integrated into the surgical table column of the surgical table. The override operating unit increases the availability of the surgical table by allowing for the control of adjustment drives of the surgical table that might no longer be available in certain circumstances via other operating units for operating the surgical table. This is the case, for instance, when there are certain errors in an electronic control unit of the surgical table, or if the other operating units, such as a corded manual operating unit or an infrared remote operating unit, for instance, are defective or not available.

The control of at least one actuator or a drive device of the surgical table by means of the override operating unit according to prior art has the disadvantage that in order to ensure a high availability of the surgical table, the actuators that must be controlled are controlled independently of the software of the control unit of the surgical table. The result is that operating functions that are achieved by means of this software, such as a collision monitoring of movable components of the surgical table by means of the actuators, for instance, are not active when the surgical table is operated by means of the override operating unit.

In particular, in prior art there is a so-called passive override control. In this passive override control, the direct control of the actuators that are to be controlled, such as an actuator of a hydraulic pump or a hydraulic valve of the surgical table, for instance, is accomplished without the processing of input control signals of the override operating unit by a microcontroller that is running respective control software. While this allows for a high availability of the surgical table since operating the surgical table is possible via the override operating unit even in certain error scenarios, no collision monitoring of components of the surgical table that are movable by means of actuators is possible. Furthermore, in the passive override control, no communication between the override operating unit and the microcontroller is possible, so that an actuator may receive differing control signals from the override operating unit and the control unit with the microcontroller. Moreover, in the passive override control, also some other functions are not available, such as the review of the tipping stability of the surgical table, the collection of "life cycle" data (meaning, among other things, the storage of information about when and how often a particular operating function was performed by a user), etc.

SUMMARY

Starting from known prior art, the task of the invention is to provide a device for controlling at least one drive device of a surgical table that also allows for a high availability of the surgical table and for a review of the direct controls of the drive device, even in case of a malfunction of its control unit.

By way of a device with the characteristics of the present disclosure, a high availability of the surgical table and for a review of the direct controls of the drive device is achieved, even in case of a malfunction of its control unit, since the drive device can be directly controlled with the aid of a second input control signal. Furthermore, the control unit receives the second input control signal or a signal based on the second input control signal. Preferentially, the device is configured in such a way that the second input control signal has priority over the first input control signal. Thus, a priority control system can be realized, in which the control unit can read the second input control signal that is to be supplied by means of an override operating unit, or a signal based on that second input control signal, in order to emit a warning, if necessary, in particular a collision warning. At the same time, this priority control system can prevent the control unit from interfering with the direct control of the drive device when this operation is performed by means of the override operating unit. This ensures a high availability of the surgical table even in case of a malfunction of the control unit on the one hand, and on the other hand it allows for the verification of the direct control of the drive device.

Preferentially, even with this priority control system, it is possible to use the control unit to perform a collision monitoring action for preventing or warning about a collision of a component of the surgical table that can be moved by means of the drive device with another component of the surgical table or with the surroundings, in particular with the floor. In addition, this priority control system allows for a communication between the override operating unit and the control unit, in that the control unit receives the second input control signal. Preferentially, the control of the drive device that is possible with the aid of the output control signal of the control unit is automatically locked when the operation is performed by means of the override operating unit.

Preferentially, the drive device can be directly controlled with the aid of the second input control signal in that the device controls the drive device with the aid of the second input control signal by bypassing the control unit. Thus, the direct control of the drive device performed with the aid of the second input control signal is characterized in that it cannot be influenced by the control unit. Direct control may be achieved, for instance, via a hard-wired control of the drive device by means of the override operating unit, the operating elements of the override operating unit being hard-wired to the drive device by means of wires, and possibly, field effect transistors (FET) or other switches. Preferentially, the drive device comprises an actuator. In particular, the actuator may be an electric motor, a valve, or a hydraulic pump. Furthermore, the drive device may also comprise one or more signal processing components upstream of the actuator, such as a PWM (pulse width modulation) module, for instance, and/or a DC/DC converter. Direct control of the drive device is in particular understood to mean the control thereof without this activation being liable to influence by a control software of the control unit.

Preferentially, in the event of a malfunction of the control unit, the device interrupts the control of the drive device with the aid of the output control signal. This can prevent the first input control signal that can be supplied by means of a standard control unit from being transferred to the drive device in the event of a malfunction of the control unit. Preferentially, upon the malfunctioning of the control unit, the device does not interrupt the direct control of the drive device that can be performed with the aid of the second input control signal. Thus, it can be ensured that even in the event of a malfunction of the control unit, the second input control signal that can be supplied by means of the override operating unit actuates a desired control of the drive device. This accomplishes that in the event of a malfunction of the control unit, only the direct control of the drive device that is performed with the aid of the second input control signal remains possible, whereas the possibly defective control of the drive device performed with the aid of the output control signal of the control unit is prevented. This results in particular in a reliable operation of the priority control system.

Preferentially, the control unit is configured to perform a collision monitoring action for preventing or warning about a collision of a component of the surgical table that can be moved by means of the drive device with another component of the surgical table or with the surroundings, based on the first input control signal and based on the second input control signal, respectively. Thus, in the priority control system, a collision monitoring action, respectively based on the first and on the second input control signal, can be performed, by means of which a security function of the device can be triggered.

Preferentially, the control unit is configured to generate at least a first warning signal when engaging in collision monitoring of whether upon controlling the drive device, the distance between a component of the surgical table that can be moved by means of the drive device and another component of the surgical table or the surroundings reaches a certain minimum or falls below it. Thus, the safety function of the device can be triggered when a stored preset collision monitoring criterion is met. Specifically, the criterion corresponds to the particular condition for generating the first warning signal.

Preferentially, the control unit is configured to check when engaging in collision monitoring whether upon controlling the drive device, the adjustment of a position of a component of the surgical table that can be moved by means of the drive device relative to that of another component of the surgical table is permissible or not, and depending on the result of this test, to generate at least a first warning signal. Thus, the generation of the at least one first warning signal can in particular be performed when a collision of the components of the surgical table that are moveable relative to each other, or a collision of a movable component of the surgical table with the surroundings, is impending or imminent, especially when the respective distance has reached a certain minimum or fallen below it.

Preferentially, the first warning signal is an optical or an acoustic warning signal. Thus, in case of an impending or imminent collision of the movable components of the surgical table, an optical or an acoustic warning signal can be emitted to warn a user.

Preferentially, the control unit is configured to generate a locking signal for a safety release unit when engaging in collision monitoring if upon controlling the drive device, the distance between a component of the surgical table that can be moved by means of the drive device and another component of the surgical table or the surroundings reaches a certain minimum or falls below it. Direct control of the drive device with the aid of the second input control signal specifically remains possible. Thus, the safety function of the device can be triggered in the form of a locking signal generated when the stored preset criterion for collision monitoring is met. The direct control of the drive device with the aid of the second input control signal is not interrupted even when the locking signal is generated.

Preferentially, the control unit is configured to receive at least a sensor signal when engaging in collision monitoring, in which the sensor signal indicates a respective position and/or a change in the position of a component of the surgical table that can be moved by means of the drive device. Thus, collision monitoring can be done by means of received sensor signals that are registered by sensors assigned to the various movable components of the surgical table.

Preferentially, the safety release device comprises a first locking unit for locking the output control signal in response to a locking signal generated by the control unit. Thus, the locking signal can be used to prevent the control of the drive device with the aid of the output control signal.

Preferentially, the first locking unit is configured to forward the output control signal to the drive device in a first switching state, and to interrupt the forwarding of the output control signal in a second switching state. Thus, it can be ensured that the control of the drive device is prevented with the aid of the output control signal when the first locking unit receives the locking signal.

Preferentially, the safety release unit comprises a second locking unit for locking the second input control signal. The second locking unit is configured to forward the second input control signal to the drive device in a first switching state, and to interrupt the forwarding of the second input control signal in a second switching state. Furthermore, the second locking unit is switched to the first switching state when the device is powered up, and remains in that first switching state even in the event of a malfunction of the control unit. This can be accomplished especially by means of a self-hold function, in which the second locking unit always remains in its first switching state. This ensures that the direct control of the drive device performed with the aid of the second input control signal is not switched off, regardless of a malfunction of the control unit or the generation of the locking signal.

Preferentially, the first input control signal in the device can be supplied via a first operating unit device that can be connected to the device. Furthermore, the second input control signal can be supplied to the device via a second operating unit that can be connected to the device. Thus, a first operating unit may be provided, in particular a standard operating unit, as well as a second operating unit, in particular an override operating unit, by means of which the first and the second input control signal can be supplied to the device independently of each other. Preferentially, the first operating unit may be connected to the device via a wireless interface, such as an IR (infrared) interface. Furthermore, the second operating unit may be hardwired to the device.

The device may comprise, for instance, a switch element, configured to interrupt the forwarding of the output control signal of the control unit for controlling the drive device, in particular an actuator, in response to the second input control signal.

The device may comprise, for instance, a safety release unit, configured to connect the drive device, in particular a PWM (pulse width modulation) module and/or a DC/DC converter to a power supply unit (PSU), in response to the second input control signal or on the release signal of the control unit.

Preferentially, the control unit, or respectively, the control unit module also referred to as "master microcontroller", receives the second input control signal or a signal based on the second input control signal. When operating by means of the override operating unit, however, the control unit can no longer influence the control of the actuator that can be accomplished with the aid of the output control signal of the control unit. Preferentially, the second input control signal causes the release of a safety release unit and activates the drive device comprising the actuator, for stance via an output stage.

Thus, for instance, the control unit is unable to prevent collisions, in particular when operations are performed by means of the override operating unit. In this case, the control unit can only generate a warning signal and emit a collision warning to the user.

Moreover, additional functions, such as, for instance, a warning of a risk of tipping over, the collection of "life cycle" data, etc. can be accomplished by means of the device according to the invention. The warning of the danger of tipping may be issued in particular when the tipping stability of the surgical table is comparatively low.

Furthermore, the present invention provides a method for controlling at least one drive device of a surgical table. The method comprises the provision of an output control signal on the basis of at least a first input control signal by means of a control unit, control of the drive device with the aid of the output control signal, and direct control of the drive device with the aid of a second input control signal. The method is characterized in that the control unit receives the second input control signal or a signal based on the second input control signal.

Further characteristics and advantages of the invention from the description below, which explains the invention in detail with reference to exemplary embodiments with reference to the accompanying figures.

DETAILED DESCRIPTION

Before the present invention is further explained below based on the figures, it is noted that in the following exemplary embodiments, identical elements or functionally similar elements are referenced throughout the figures with the same reference numbers. A description of elements with the same reference number is therefore mutually interchangeable and/or applicable in the various exemplary embodiments.

Figure 1:
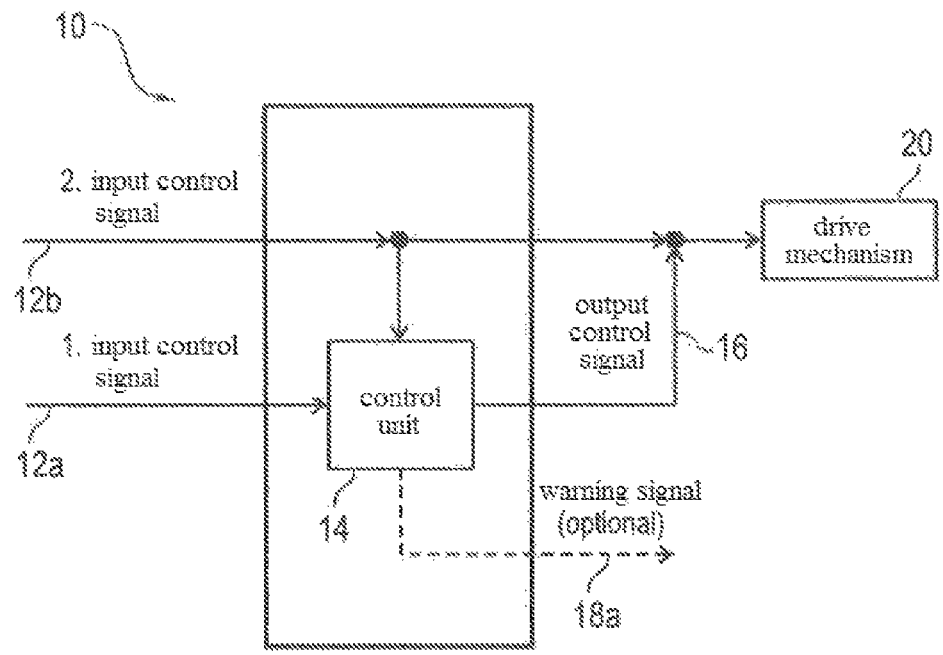
FIG. 1 shows a block diagram of a device for controlling at least one drive device of a surgical table with a control unit according to an exemplary embodiment.

FIG. 1 shows a block diagram of a device 10 for controlling at least one drive device 20 of a surgical table, comprising a control unit 14 according to an exemplary embodiment. As shown in FIG. 1, the device 10 receives a first input control signal 12*a* and a second input control signal 12*b* and forwards these to the control unit 14. The control unit 14 is used to provide an output control signal 16 based on the first input control signal 12*a*. Furthermore, the control unit 14 may serve to generate a warning signal 18*a*. In particular, the control unit 14 receives the second input control signal 12*b*. By means of the warning signal 18*a*, a user may be warned of an impending or imminent collision of the movable components of the surgical table.

Alternatively or in addition, other functions of the device 10 can also be used to issue a warning to the user by means of the control unit 14. These other functions of the device 10, comprise, for instance, a warning of a danger of tilting if a comparatively low tipping stability of the surgical table is reached, or an alert relating to "life cycle" data, that is, depending on stored information about when and how often a particular operating function was activated by the user. In other words, a possible application is that the user is alerted based on collected life cycle data. Preferentially, however, the life cycle data are not stored in order to alert the user, but only for "service" or informational purposes (meaning: for information of the user only).

In the exemplary embodiment shown in FIG. 1, the drive device 20 is controlled with the aid of the output control signal 16. Furthermore, the drive device 20 is controlled directly with the aid of the second input control signal 12*b*. The direct control of the drive device 20 performed with the aid of the second input control signal 12*b* has priority over the control of the drive device 20 performed with the aid of the output control signal 16. This allows for the realization of priority control of the drive device 20 of the surgical table, which continues to function even when the control unit has failed.

Figure 2:
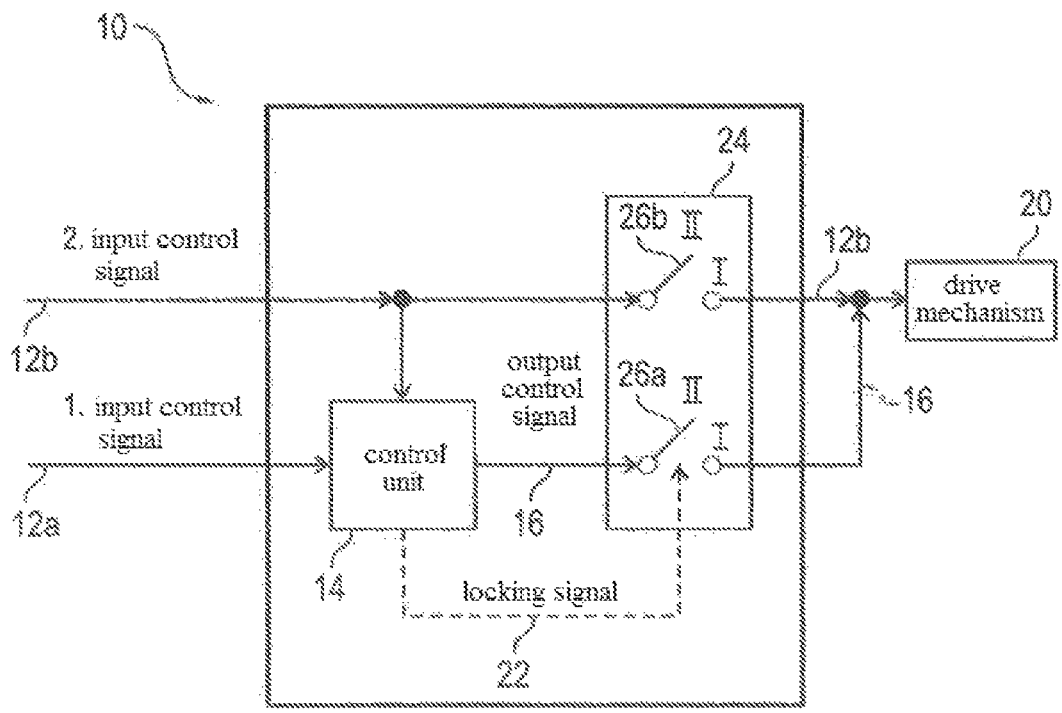
FIG. 2 shows a block diagram of the device in FIG. 1 with a safety release unit according to an exemplary embodiment.

FIG. 2 shows a block diagram of the device 10 according to FIG. 1 with a safety release unit 24 according to an exemplary embodiment. In the exemplary embodiment shown in FIG. 2, the device 10 comprises the control unit 14 and the safety release unit 24. The control unit 14 is used to provide the output control signal 16 based on the first input control signal 12*a*. Furthermore, the control unit 14 can be used to generate a locking signal 22 for the safety release unit 24. As shown in FIG. 2, the safety release unit 24 comprises a first locking unit 26*a* and a second locking unit 26b. The first locking unit 26a is used to lock the output control signal 16 in response to the locking signal 22 generated by the control unit 14. Furthermore, the second locking unit 26b is used for locking the second input control signal 12b. FIG. 2 shows schematically that the first and the second locking units 26a, 26b each have a first switching state (I) and a second switching state (II), between which alternation is possible.

Preferentially, in the first switching state I of the first locking unit 26a, the output control signal 16 is forwarded to the drive device 20. Furthermore, in the second switching state II of the first locking unit 26a, the forwarding of the output control signal 16 to the drive device 20 is interrupted. The first locking unit 26a switches from the first switching state I to the second switching state II when the first locking unit 26a receives the locking signal 22 generated by the control unit 14.

In the first switching state I of the second locking unit 26b, the second input control signal 12b is forwarded to the drive device 20. Furthermore, in the second switching state II of the second locking unit 26b, the forwarding of the second input control signal 12b is interrupted. Preferentially, the second locking unit 26b is switched to the first switching state I after the powering up of the device 10, and remains in this first switching state I even in the event of a malfunction of the control unit 14. This can be realized in particular by means of a self-hold function of the second locking device 26b.

The generation of the warning signal 18a or, respectively, of the locking signal 22 for the safety release unit 24, schematically illustrated in FIGS. 1 and 2, can be performed in particular by using the control unit 14 to perform a collision monitoring action of a component of the surgical table that can be moved by means of the drive device 20. The control unit 14 performs the collision monitoring action based on the first and the second input control signals 12a, 12b.

Figure 3:
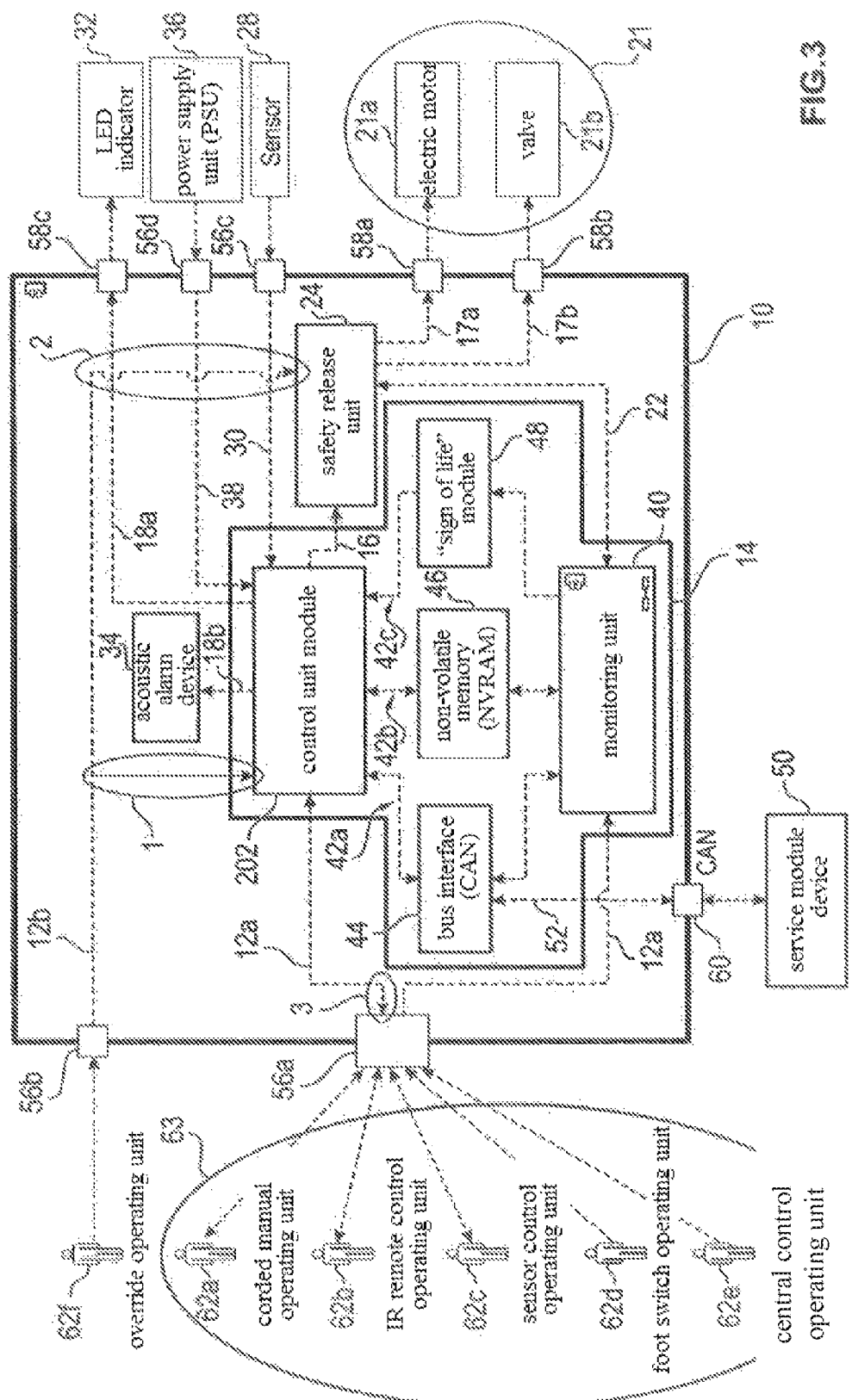
FIG. 3 shows a block diagram of the device in FIG. 1 with a first operating unit and a second operating unit according to an exemplary embodiment.

FIG. 3 shows a block diagram of the device 10 according to FIG. 1 with a first operating unit 62a through 62e and a second operating unit 62f. In the exemplary embodiment shown in FIG. 3, the device 10 comprises the control unit 14 and the safety release unit 24. In particular, the control unit 14 shown in FIG. 3 comprises a control unit module 202 and a monitoring unit 40. The monitoring unit 40 is used to determine a malfunctioning of the control unit 14. Furthermore, the monitoring unit 40 can provide the locking signal 22 for the safety release unit 24. As shown in FIG. 3, the control unit module 202 and the monitoring unit 40 are connected via a plurality of communication paths 42a through 42c. The first communication path 42a comprises a bus interface 44 (CAN). The second communication path 42b comprises a non-volatile memory 46 (NVRAM). The third communication path 42c comprises a "sign of life" module 48. The bus interface 44, the non-volatile memory 46 and the "sign of life" module 48 are used for the transfer or storage of signal information that can be exchanged between the control unit module 202 and the monitoring unit 40. Preferentially, this signal information comprises information about the malfunctioning of the control unit 14.

In the exemplary embodiment shown in FIG. 3, the monitoring unit 40 receives the first input control signal 12a. Furthermore, the monitoring unit 40 controls the safety release unit 24 in response to information on a malfunction of the control unit 14, received via one of the communication paths 42a through 42c. Preferentially, the monitoring unit 40 controls the safety release unit 24 in such a way that in the event of a malfunction of the control unit 14, the control of the electric motor 21a and of the valve 21b with the aid of the output control signal 16 is interrupted, and that the direct control of the electric motor 21a and of the valve 21b with the aid of the second input control signal 12b is not interrupted. The signal paths 17a and 17b, respectively, serve for forwarding the output control signal 16 and the second input control signal 12b to the electric motor 21a or to the valve 21b. Furthermore, the signal paths 17a, 17b run through respective output nodes 58a, 58b of the device 10. In the exemplary embodiment shown in FIG. 3, the drive device comprises a plurality of actuators 21, in particular the electric motor 21a and the valve 21b. The electric motor 21a operates, for instance, a hydraulic pump.

In the exemplary embodiment of FIG. 3, the device 10 is connected to a first operating unit 62a through 62e and to a second operating unit 62f. The first operating unit 62a through 62e is used to supply the first input control signal 12a to the device 10. Furthermore, the second operating unit 62f is used to supply the second input control signal 12b to the device 10. The first operating unit 62a through 62e comprises, for instance, a corded manual operating unit 62a, an infrared remote operating unit 62b, a sensor control operating unit 62c, a foot switch operating unit 62d, or a central control operating unit 62e. The first operating unit 62a through 62e is connected to the device 10 via a wireless or wired first interface 56a. Preferentially, the corded manual operating unit. 62a is hard-wired to the device 10, whereas the IR remote control operating unit 62b, the sensor control operating unit 62c, the foot switch operating unit 62d and the central control operating unit 62e are connected to the device 10 via an IR interface. The second operating unit 62f is, in particular, an override operating unit. Preferentially, the second operating unit 62f is hard-wired with the device 10. As shown in FIG. 3, the device 10 receives the second input control signal 12b from the second operating unit 62f via an input node 56b.

The second input control signal 12b is received by the control unit module 202 (signal path 1). Furthermore, the second input control signal 12b is received by the safety release unit 24 (signal path 2). Signal path 1 is used to read the second input control signal 12b supplied by the second operating unit 62f by means of the control unit 14, in particular in order to issue a collision warning. Furthermore, signal path 2 is used for the direct control of the safety release unit 24 and for direct control of the actuators 21, in particular of the electric motor 21a and of the valve 21b, by means of the second operating unit 62f. Direct control of the actuators 21 should be understood here in particular as the direct control of the actuators 21 while bypassing the control unit 14, that is, bypassing the control unit module 202 and the monitoring unit 40.

The various first control units 62a through 62e form, in particular, a group 63 of first operating units. According to the exemplary embodiment of FIG. 3, the control unit module 202 receives the first input control signal 12a via a preferentially bi-directional communication link 3 between the control unit module 202 and the group 63 of first operating units. The bi-directional communication link 3 is used to control the actuators 21 by means of the control unit module 202.

In the exemplary embodiment shown in FIG. 3, the control unit module 202 is used to perform the collision monitoring action based on the first or on the second input control signal 12a, 12b, respectively, and for emitting the respective collision warning. As shown in FIG. 3, the control unit module 202 receives a sensor signal 30 captured by a sensor 28 via an input node 56c of the device. Preferentially, the sensor signal 30 emits a position and/or a change of position of a component of the surgical table that can be moved by means of the electric motor 21a. The control unit module 202 checks, in particular, whether the change of position of the movable component of the surgical table relative to a position of another component of the surgical table that was registered by the sensor 28 is permitted or not. Preferentially, the registered change of position of the movable component of the surgical table is not permitted when the electric motor 21a is controlled in such a way that the distance between of the component of the surgical table that can be moved by means of the electric motor 21a to another component of the surgical table or to its surroundings has reached a certain minimum of fallen below it. In the event that the registered position change is not allowed, the control unit module 202 will preferentially generate a first optical warning signal 18a and a second acoustic warning signal 18b. As shown in FIG. 3, the first optical warning signal 18a may be forwarded via an output node 58c of the device 10 to an LED (light emitting diode) indicator 32. Furthermore, the second acoustic warning signal 18b may be forwarded to an alarm signaling device 34 comprised by the device 10. The LED indicator 32 and the acoustic alarm signaling device 34 are used to warn the user in the event of an impending or imminent collision of the component of the surgical table that can be moved by means of the electric motor 21a.

According to FIG. 3, the control unit module 202 is preferentially connected to a power supply unit 36 (PSU) via a signal path 38 that passes through an input node 56d of the device 10. The power supply unit 36 is used to provide power to the control unit module 202.

Furthermore, according to FIG. 3, the bus interface 44 (CAN) may be connected to a service module device 50 via a signal path 52 that passes through a bus node 60 of the device 10. The service module device 50 is used to configure the bus interface 44 in response to user input.

Figure 4:
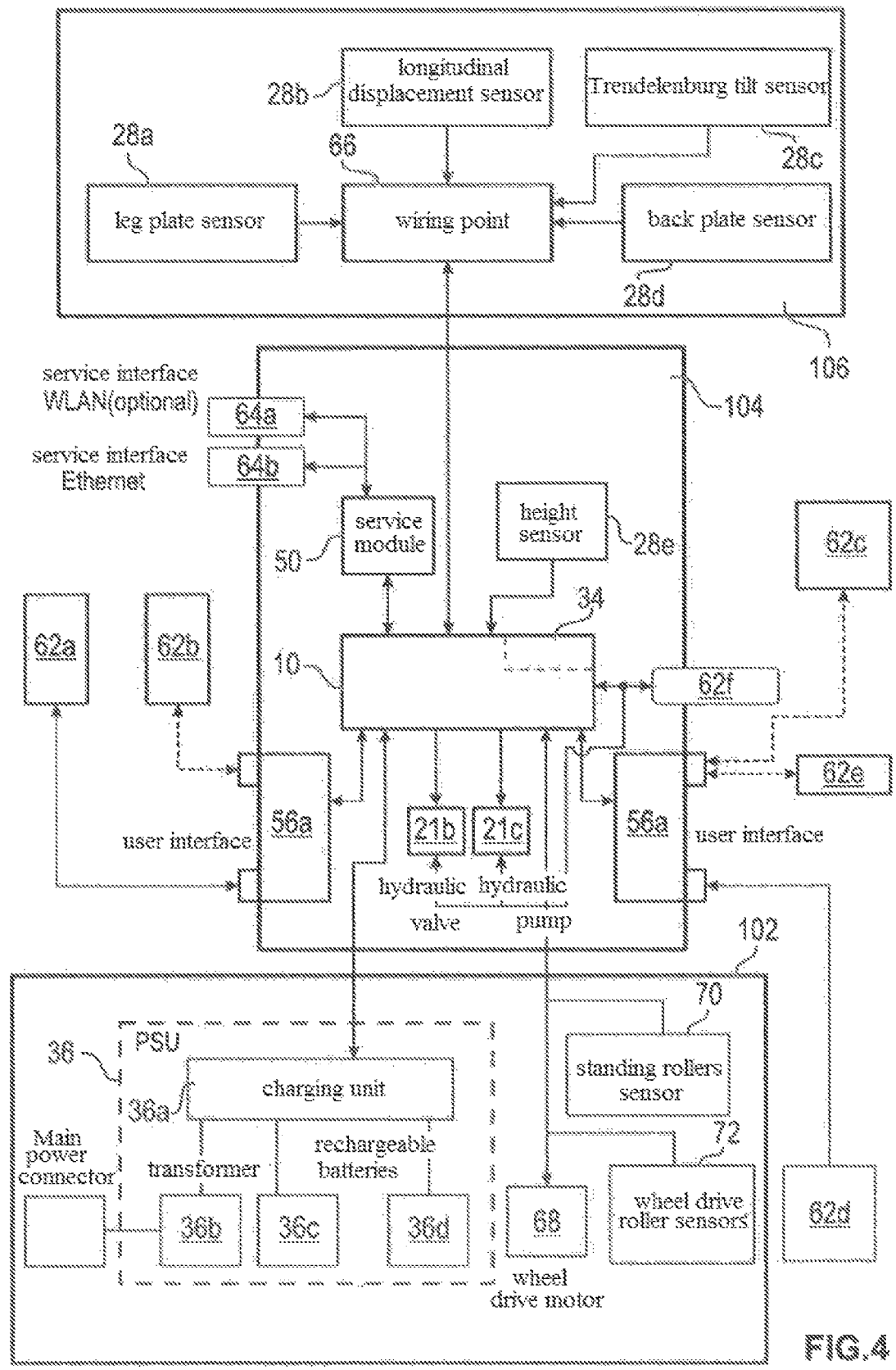
FIG. 4 is a schematic representation of a surgical table with the device in FIG. 1 according t an exemplary embodiment.

FIG. 4 shows a schematic representation of a surgical table 100 with the device 10 according to FIG. 1 according to an exemplary embodiment. As shown in FIG. 4, the surgical table 100 comprises a foot 102 and a column 104 of the surgical table, as well as a patient support surface 106. In the exemplary embodiment shown in FIG. 4, the device 10 according to FIG. 1 is integrated into the column 104 of the surgical table 100. The device 10 integrated into the column 104 of the surgical table with the control unit 14 not shown in FIG. 4 and with the acoustic alarm signaling device 34 is used to control the hydraulic valve 21b and a hydraulic pump 21c of the surgical table 100. As schematically shown in FIG. 4, the column 104 of the surgical table comprises the first input interface 56a, embodied as an IR interface, for connecting the first operating unit 62a through 62d with the device 10. The first input interface 56a is used in particular for connecting the corded manual operating unit 62a, the IR remote control operating unit 62b, the sensor control operating unit 62c, the foot switch operating unit 62d, and the central control operating unit 62e. Furthermore, the column 104 of the surgical table comprises the second control unit 62f. Preferentially, the second operating unit 62f is integrated into the column 104 of the surgical table. As schematically shown in FIG. 4, the second operating unit 62f is connected to the device 10. Furthermore, the second operating unit 62f is used to directly control the hydraulic valve 21b and the hydraulic pump 21c.

According to FIG. 4, the column 104 of the surgical table comprises the service module device 50 that can be connected to the device 10. The service module 50 is connected in particular with a first interface 64a, for instance a WLAN interface, and with a second interface 64b, for instance an Ethernet interface. By means of the service module device 50, the user may configure the control unit 14 of the device 10 accordingly.

According to FIG. 4, the device 10 is connected with the power supply unit 36 (PSU) built into the foot 102 of the surgical table. The power supply unit 36 in particular comprises a charging unit 36a, which is connected to a central power supply of the surgical table 100 via a transformer 36b, and which is also connected with rechargeable batteries 36c, 36d. Furthermore, according to FIG. 4, the device 10 may be connected with a wheel drive motor 68, a sensor 70 for detecting the position of four standing rollers, and a sensor 72 that detects the position of a wheel drive roller, in which the wheel drive motor 68 and the sensors 70, 72 are integrated into the foot 102 of the surgical table.

In the exemplary embodiment of FIG. 4, the device 10 is connected with a leg plate sensor 28a, a longitudinal displacement sensor 28b, a "Trendelenburg" or tilt sensor 28c, and a back plate sensor 28d by means of a coupling interface 66 integrated into the patient support surface 106, in particular a wiring point 66. The coupling interface 66 is also used for the connection of valves are located in the patient support surface 106 with the device 10. Furthermore, a height sensor 28e connected to the device 10 may be provided in the column 104 of the surgical table. By means of these sensors 28a through 28e, various parameters may be registered during a movement of components of the surgical table 100, in particular their respective position and/or change of position, and fed to the control unit 14 of the device 10.

Figure 5:
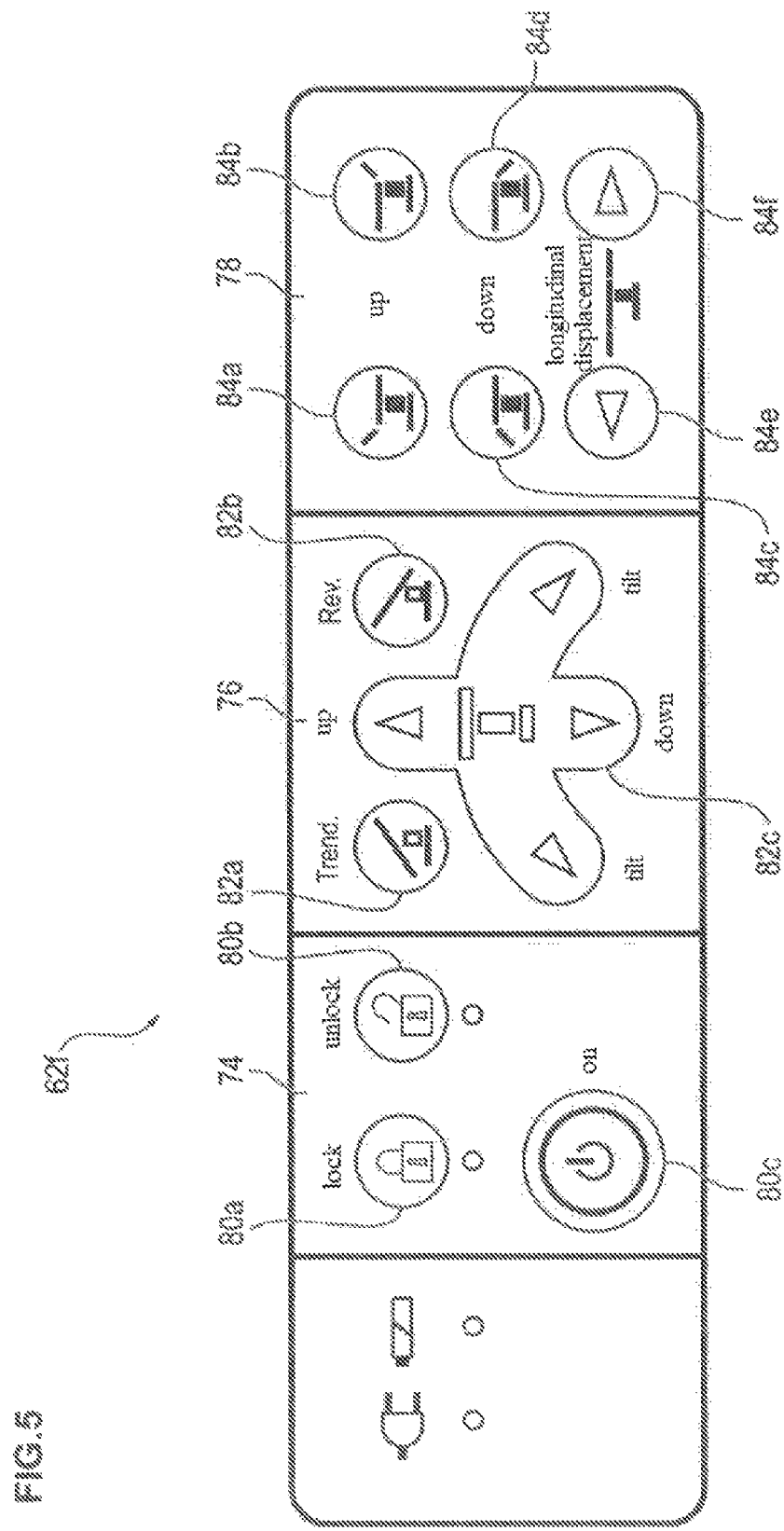
FIG. 5 is a schematic representation of the second operating unit according to FIG. 3 with several exemplary operating panels and operating elements.

FIG. 5 shows a schematic representation of the second operating unit 62f according to FIG. 3 with several exemplary operating fields 74 through 78 and operating elements 80a through 80c, 82a through 82c, and 84a through 84f, respectively. Preferentially, the second operating unit 62f comprises a membrane keypad. In particular, the operating elements 80a through 80c, 82a through 82c, and 84a through 84f are key elements integrated into the membrane keypad in order to realize various functions of the surgical table. By means of the operating elements 80a, 80b, for instance, a lock function or, respectively, a release function can be activated. Furthermore, by means of the operating element 80c, the second operating unit 62f may be switched on or off.

The activation of a Trendelenburg tilt, or respectively, of a reversible Trendelenburg tilt of the patient support surface is possible by means of the operating elements 82a, 82b. Furthermore, an upward or a downward movement and for a tilting movement of the patient support surface are possible by means of the operating element 82c.

An upward movement of a back plate or an upward movement of a leg plate are possible by means of the operating elements 84a, 84b. Furthermore, a downward movement of the back plate and a downward movement of the leg plate are possible by means of the operating elements 84c, 84d. In addition, a longitudinal displacement of the patient support surface is possible by means of the operating elements 84e, 84f in two opposite directions.

Figure 6:
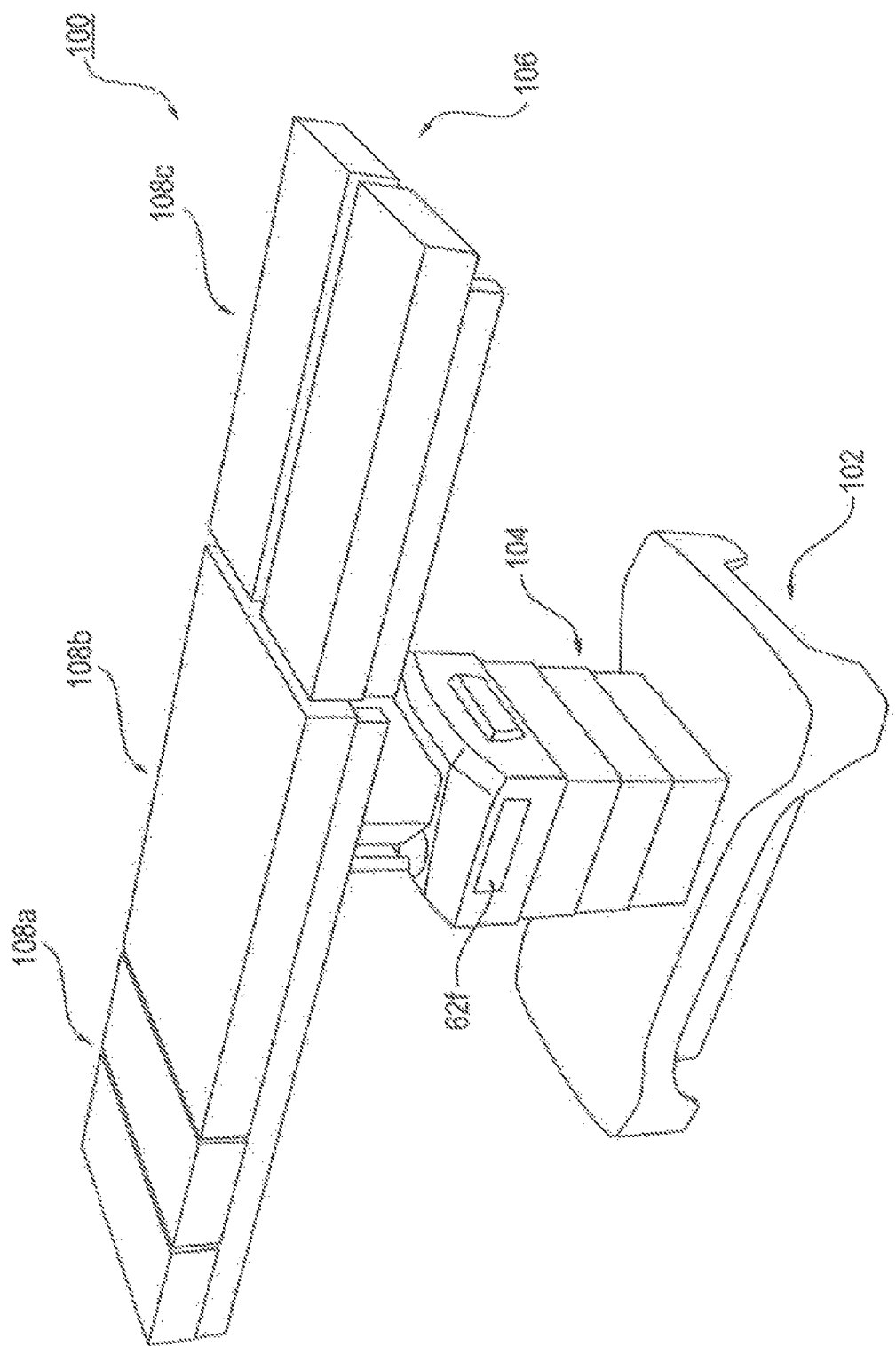
FIG. 6 is a schematic perspective view of a surgical table with the second operating unit according to FIG. 3 and a plurality of components of the surgical table that can be moved by means of actuators, according to an exemplary embodiment.

FIG. 6 shows a schematic perspectival view of a surgical table 100 with the second operating unit 62f according to FIG. 3 and with a plurality of components 108a through 108c of the surgical table 100 that can be moved by means of actuators 21, according to one exemplary embodiment. In particular, the surgical table 100 shown in FIG. 6 comprises the foot 102 and the column 104 of the surgical table, as well as the patient support surface 106. The column 104 of the surgical table is arranged on the foot 102. Furthermore, the patient support surface 106 is positioned on the column 104 of the surgical table. As shown schematically in FIG. 6, the patient support surface 106 comprises in particular a back plate section with the movable component 108a, a base plate section with the movable component 108b, and a leg plate section with the movable component 108c. The standing rollers and the wheel drive roller that are integrated into the foot 102 of the surgical table and which are detectable by means of the sensors 70, 72 are not shown in FIG. 6. In particular, the standing rollers of the foot 102 of the surgical table foot can be retracted, ensuring the stability of the surgical table 100 and the safety of operations. This condition is referred to in particular as "lock" mode. When the standing rollers of the foot 102 of the surgical table are in the state also referred to as "unlock" mode, the surgical table 100 can be moved.

Preferentially, the movable components 108a through 108c shown in FIG. 6 are moved correspondingly by means of the actuators 21 controlled by the device 10. Furthermore, the position and/or the change of position of the movable components 108a through 108c of the surgical table 100 may be respectively registered by sensors, for instance by means of the sensor 28 shown in FIG. 3, and used for the collision warning.

In the exemplary embodiment of FIG. 6, the second operating unit 62f is incorporated in the upper part of the trim of the surgical table column 104. Furthermore, the second operating unit 62f may also be integrated in the foot 102 of the surgical table.

Figure 7:
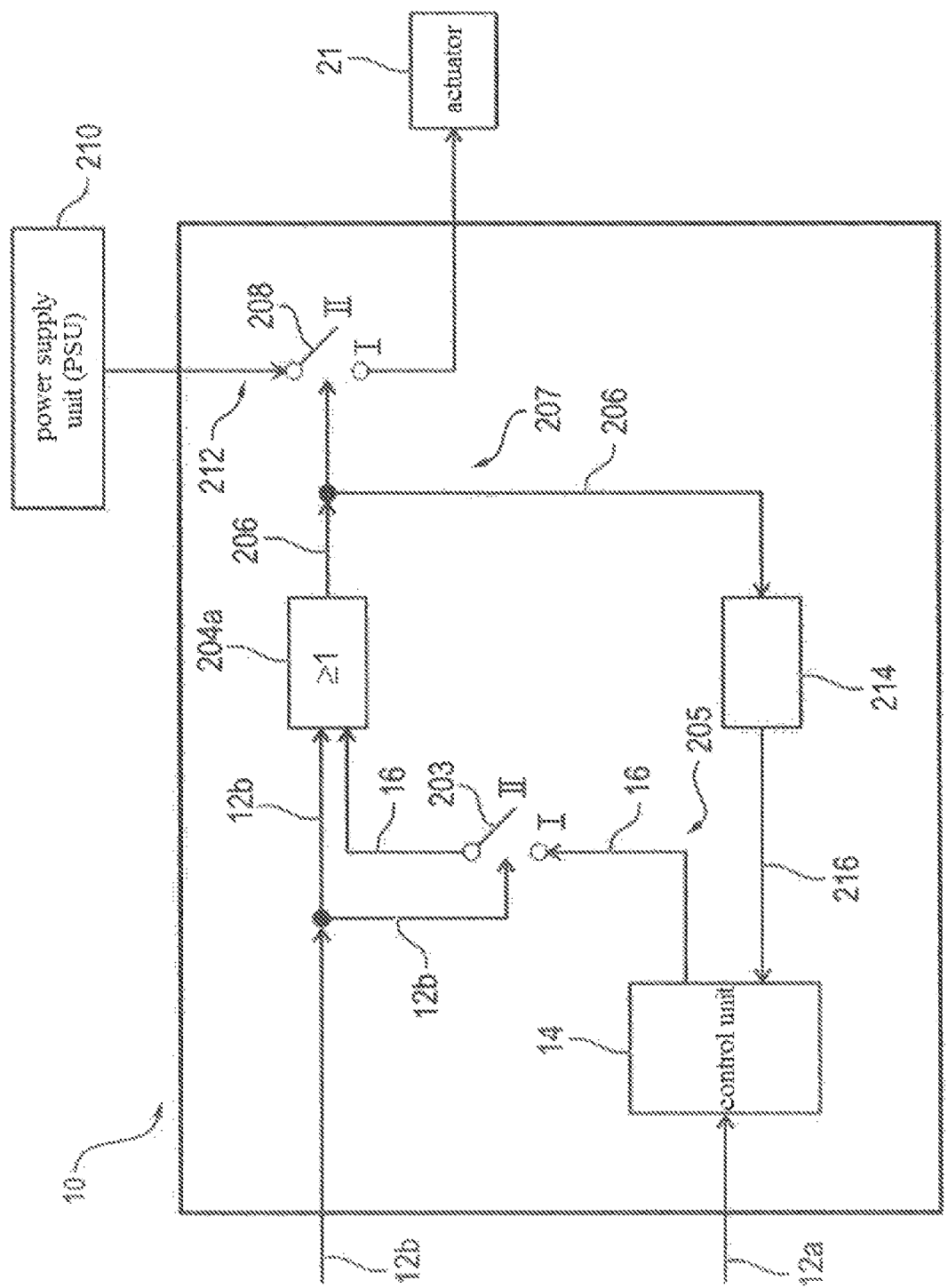
FIG. 7 is a block diagram of a device for controlling at least one actuator of a surgical table with a control unit according to another exemplary embodiment.

FIG. 7 shows a block diagram of a device 10 for controlling at least one actuator 21 of a surgical table with a control unit 14 according to another exemplary embodiment. The exemplary embodiment of FIG. 7 illustrates an exemplary embodiment that is an alternative to the exemplary embodiment of FIG. 1. In the exemplary embodiment shown in FIG. 7, the device 10 receives a first input control signal 12a and a second input control signal 12b, and forwards the first input control signal 12a to the control unit 14. The control unit 14 is used to provide an output control signal 16 based on the first input control signal 12a. Furthermore, the device 10 forwards the output control signal 16 to a switch element 203, such as a "pull-up" resistor, on. The switch element 203 is configured to forward the output control signal 16 in a first switching state (I) to a first OR gate 204a of the device 10, and to interrupt the forwarding of the output control signal 16 to the first OR gate 204a of the device 10 in a second switching state (II). As a rule, the switch element 203 assumes the first switching state (I).

Furthermore, the device 10 forwards the second input control signal 12b to the first OR gate 204a and to the switch element 203. The switch element 203 is configured to switch from the first switching state (I) into the second switching state (II) in response to the second input control signal 12b. When this happens, the communication path 205 between the control unit 14 and the first OR gate 204a is interrupted, meaning that the control unit 14 is switched off.

Furthermore, the first OR gate 204a is configured to generate an OR-linked signal 206 based on the second input control signal 12b and the output control signal 16. The device 10 forwards the OR-linked signal 206 to a further switch element 208. The switch element 208 is configured to connect the actuator 21 via a signal path 212 to a power supply unit 210 (PSU) in a first switching state (I), and to interrupt the signal path 212 between the power supply unit 210 and the actuator 21 in a second switching state (II). As a rule, the switch element 208 assumes the second switching state (II). Furthermore, the switch element 208 is configured to switch from the second switching state (II) into the first switching state (I) in response to the OR-linked signal 206 in order to connect the actuator 21 with the power supply unit 210. This means that the actuator 21 is powered, and thus unlocked.

In the exemplary embodiment shown in FIG. 7, the device 10 forwards the OR-linked signal 206 to a signal conditioner 214 via a feedback path 207 between the first OR gate 204a and the control unit 14. The signal conditioner 214 is configured to generate a modified signal 216 based on the OR-linked signal 206. Preferentially, the signal conditioner 214 processes the OR-linked signal 206 in such a way that the modified signal 216 can be read by the control unit 14.

When the first input control signal 12a is supplied to the device 10 via a first operating unit 62a through 62e that a can be connected with the device 10, the connection path 205 between the control unit 14 and the first OR gate 204a is not interrupted, so that the OR-linked signal 206 is generated based on the output control signal 16 in order to connect the actuator 21 via the uninterrupted signal path 212 with the power supply unit 210. As a result, control of the actuator 21 is accomplished with the aid of the output control signal 16. Furthermore, in this case, the device 10 does not receive the second input control signal 12b.

When the second input control signal 12b is supplied to the device 10 via a second operating unit 62f that can be connected with the device 10, the connection path 205 between the control unit. 14 and the first OR gate 204a is interrupted, so that the OR-linked signal 206 is generated, based only on the second input, control signal 12b, in order to connect the actuator 21 via the uninterrupted signal path 212 with the power supply unit 210. As a result, a control of the actuator 21 is accomplished with the aid of the second input control signal 12b. Furthermore, in this case, the control of the actuator 21 with the aid of the output control signal 16 is prevented, even when the device 10 receives the first input control signal 12a.

In the exemplary embodiment shown in FIG. 7, the control unit 14 can read the modified signal 216 received via the feedback path 207 between the first OR gate 204a and the control unit 14 when the device 10 receives the first input control signal 12a or the second input control signal 12b.

Figure 8:
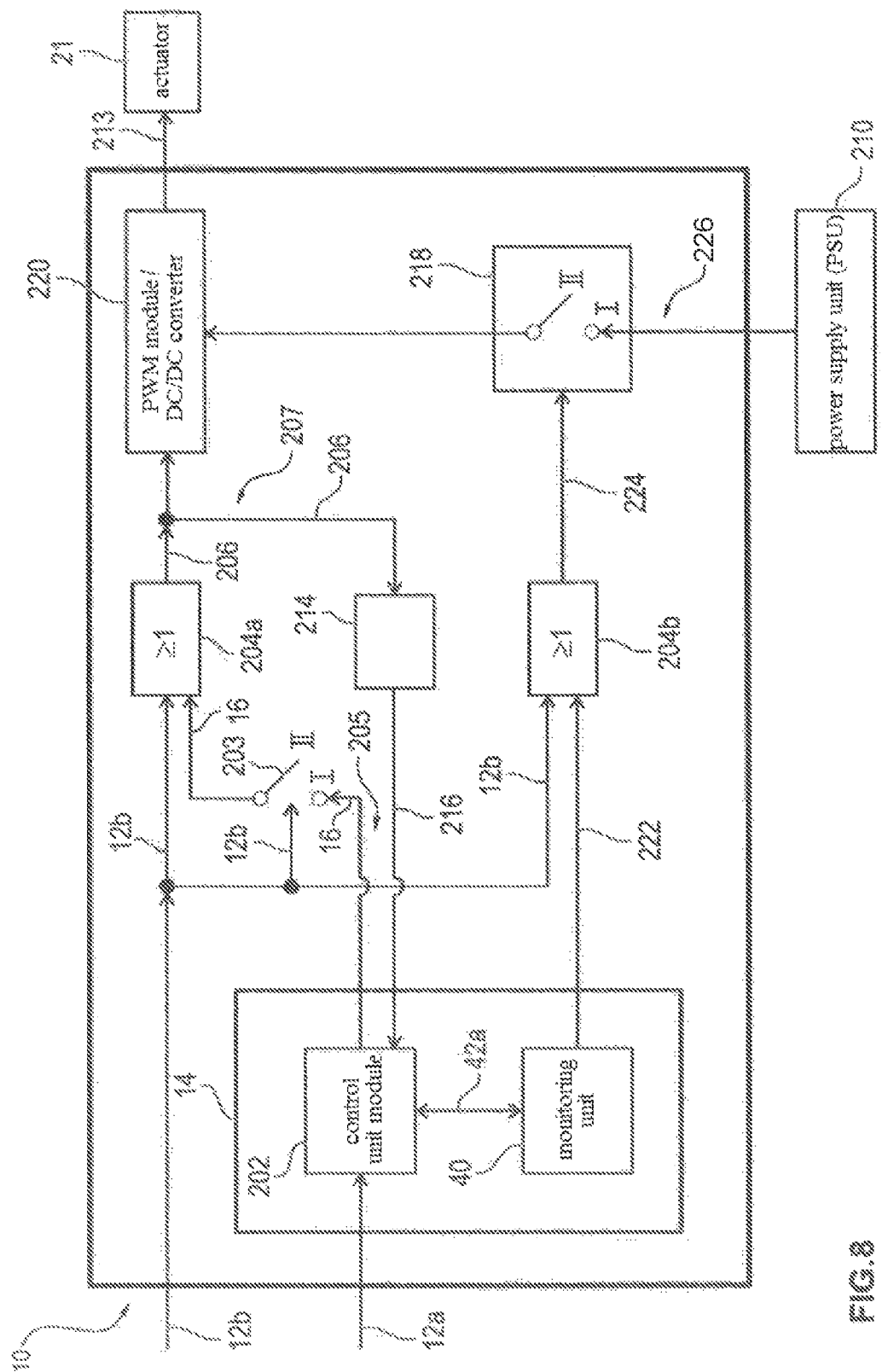
FIG. 8 is a block diagram of a device for controlling at least one actuator of a surgical table with a control unit according to another exemplary embodiment.

FIG. 8 shows a block diagram of a device 10 for controlling at least one actuator 21 of a surgical table with a control unit 14 according to another exemplary embodiment. The exemplary embodiment of FIG. 8 essentially corresponds to the exemplary embodiment of FIG. 7. In the exemplary embodiment shown in FIG. 8, the control unit 14 comprises a control unit module 202 and a monitoring unit 40, which are connected with each other via a communication path 42a. As shown in FIG. 8, the device 10 receives the first input control signal 12a and the second input control signal 12b, and forwards the first input control signal 12a to the control unit module 202. The control unit module 202 is used to provide the output control signal 16 based on the first input control signal 12a. Furthermore, the control unit module 202 may read the modified signal 216 received via the feedback path 207 between the first OR gate 204a and the control unit module 202. The monitoring unit 40 is configured to generate a release signal 222 in response to information on a malfunction of the control unit module 202. Preferentially, the monitoring unit 40 generates the release signal 222 when no malfunctioning of the control unit module 202 exists, whereas the monitoring unit 40 does not generate the release signal 222 when a malfunction of the control unit module 202 does exist.

In the exemplary embodiment of FIG. 8, the device 10 further comprises a second OR gate 204b. The second OR gate 204b is configured to generate a further OR-linked signal 224 based on the second input control signal 12b and the release signal 222. The device 10 forwards the OR-linked signal 224 to a safety release unit 218 of the device 10. The safety release unit 218 is configured to connect a PWM module and/or a DC/DC converter 220 of the drive unit via a connecting path 226 to a power supply unit (PSU) 210 in a first switching state (I), and in a second switching state (II) not to connect the PWM module and/or the DC/DC converter 220 via the communication path 216 to the power supply unit 210. As a rule, the safety release unit 218 assumes the second switching state (II). Furthermore, the safety release unit 218 is configured to switch from the second switching state (II) into the first switching state (I) in response to the OR-linked signal 224. In the event that the safety release unit 218 assumes the first switching state (I), the PWM module and/or the DC/DC: converter 220 are powered via the connection path 226. In this case, the PWM module and/or the DC/DC converter 220 generates a signal 213 suitable to control the actuator 21, based on the OR-linked signal 206.

When the second input control signal 12b is supplied to the device 10 via the second operating unit 62f that can be connected to the device 10, the safety release unit 218 is switched by the OR-linked signal 224 into the first switching state (I), so that the PWM module and/or the DC/DC converter 220 are connected to the power supply unit 210 via the uninterrupted connection path 226 in order to control the actuator 21 by means of the OR-linked signal 206. In particular, this is done irrespective of whether the device 10 receives the first input control signal 12a.

When the monitoring unit 40 produces the release signal 222, that is, when there is no malfunctioning of the control unit module 202, the safety release unit 218 can be switched back into the first switching state (I) by means of the OR-linked signal 224, so that the PWM module and/or the DC/DC converter 220 will be connected to the power supply unit 210 via the uninterrupted connection path 226 in order to control the actuator 21 by means of the OR-linked signal 206. This ensures in particular that the control of the actuator 21 with the aid of the first input control signal 12a can be unlocked for a short time.

By means of the present invention, a high availability of the surgical table 100 can be accomplished, since the operation of the surgical table 100 can be performed even in the event of a malfunction of the control unit 14 or of the control unit module 202, respectively, by means of the override operating unit 62f. In particular, there is the option of warning or informing the user, for instance by means of collision monitoring or by means of a diagnosis of the override functionality. Furthermore, the present invention has the advantage that communications between the override operating unit 62f and the control unit are possible 14. This is used, for instance, for the activation of additional functions of the device 10, such as the warning of a danger of tipping or for the registration of "life cycle" data.

In the hydraulically controlled surgical table 100 according to FIG. 6, two operating elements in particular can contribute to the operating of the second operating unit 62f, preferentially the operating element 80c for switching on the hydraulic pump 21c, and one of the operating elements 80a, 80b, 82a through 82c, and 84a through 84f for activating an operating function such as closing or opening the hydraulic valve 21b.

According to exemplary embodiments, the control of the surgical table 100 is done by means of a "master/slave" architecture as a security measure, based on the monitoring unit 40. The safety release unit 24 comprises in particular the first locking unit 26a, by means of which the monitoring unit 40 can accomplish an emergency stop in the event of a malfunction of the control unit 14.

The second operating unit 62f is preferentially used when the control unit 14 is defective, or when a manual operating unit, in particular the corded manual operating unit 62a is defective. Furthermore, the second operating unit 62f can also be used when a wireless manual control unit, in particular the IR remote operating unit 62b, is defective.

The present invention in particular has the following advantages over prior art. The control unit 14 can read the second input control signal 12b of the second operating unit 62f, and thus in particular perform collision monitoring. However, when the collision of a movable component of the surgical table 100 is registered by the control unit 14, there is no interruption of the direct control of the drive device 20 or of the actuator 21 with the aid of the second input control signal 12b. Rather, the control unit 14 preferentially only generates of a warning signal 18a in order to warn the user of a collision, in particular an optical or acoustic warning signal. This accomplishes that in the event of a malfunction of the control unit 14, other than with the control of the actuator 21 with the aid of the output control signal 16 of the control unit 14, direct control of the actuator 21 remains possible with the aid of the second input control signal 12b.

More particularly, the present invention allows for direct control of the actuator 21 without the microcontroller of the control unit 14 being able to interrupt this direct control of the actuator 21. In particular, this is also the case in the event of failure or malfunctioning of the microcontroller of the control unit 14. Preferentially, it is presumed that the second locking unit 26b of the safety release unit 24 is switched into the first switching state at some point during the powering up of the device 10.

Furthermore, the present invention allows for the reading of the second input control signal 12b of the second operating unit 62f by means of the control unit 14, in particular when the control unit 14 is active. Thus, collision monitoring, and if applicable, the warning of the user of an impending or imminent collision of the movable component of the surgical table, can be performed as described with the exemplary embodiments.

LIST OF REFERENCE NUMBERS 1, 2, 17a, 17b, 38, 52 signal path
3 communication link
10 device
12a, 12b input control signal
14 control unit
16 output control signal
18a, 18b warning signal
20 drive device
21 actuator
21a electric motor
21b valve
21c hydraulic pump
22 locking signal
24, 218 safety release unit
26a, 26b locking unit 28, 28a through 28e sensor
30 sensor signal
32 LED indicator
34 acoustic alarm
36, 210 power supply unit
36a through 36d components of the power supply unit
40 monitoring unit
42a through 42c communication path
44 bus interface
46 non-volatile memory
48 "sign of life" module
50 service module device
56a, 64a, 64b interface
56b through 56d input node
58a through 58c output node
60 bus node
62a through 62e first operating unit
62f second operating unit
63 group of first operating units
66 wiring point
68 wheel drive motor
70 standing rollers sensor
72 wheel drive roller sensors
74 through 78 operating fields
80a through 80c, 82a through 82c, 84a through 84f operating elements
100 surgical table
102 through 106, 108a through 108c components of the surgical table
202 control unit module
203, 208 switch element
204a, 204b OR gate
205, 212, 226 connection path
206, 224 OR-linked signal
207 feedback path
214 signal conditioner
216 modified signal
220 PWM module or DC/DC converter
222 release signal

The invention claimed is:

1. A device for controlling at least one drive device of a surgical table, the device comprising a control unit for providing an output control signal on the basis of at least a first input control signal and a safety release unit comprising a first locking unit for locking the output control signal in response to a locking signal generated by the control unit;
the device being configured such that the drive device is controllable by the output control signal, and that the drive device is directly controllable by a second input control signal;
wherein the control unit receives the second input control signal or a signal based on the second input control signal,
wherein the safety release unit further comprises a second locking unit for locking the second input control signal, wherein the second locking unit is configured to forward the second input control signal to the drive device in a first switching state, and to interrupt the forwarding of the second input control signal in a second switching state, and wherein the second locking unit is switched to the first switching state after the powering up of the drive device.

2. A device according to claim 1, wherein the drive device is directly controllable with the aid of the second input control signal such that the device controls the drive device with the aid of the second input control signal, bypassing the control unit.

3. A device according to claim 1, wherein the control unit is configured to perform collision monitoring based on the first input control signal and on the second input control signal, respectively, for a collision between a component of the surgical table that may be moved by the drive device and another component of the surgical table or the surroundings of the component of the surgical table.

4. A device according to claim 3, wherein the control unit is configured to generate at least a first warning signal upon having performed collision monitoring, if upon the actuation of the drive device, the distance between a component of the surgical table that can be moved by the drive device and another component of the surgical table or the surroundings of the component of the surgical table reaches a certain minimum or falls below it.

5. A device according to claim 3, wherein the control unit is configured to check while performing collision monitoring whether a change of position of a component of the surgical table that can be moved by the drive device relative to a position of another component of the surgical table is permitted or not, and depending on the result, to generate at least a first warning signal.

6. A device according to claim 5, wherein the first warning signal is an optical or an acoustic warning signal.

7. A device according to claim 3, wherein the control unit is configured to generate the locking signal for the safety release unit upon having performed collision monitoring, if upon the actuation of the drive device, the distance between a component of the surgical table that can be moved by the drive device and another component of the surgical table or the surroundings of the component of the surgical table reaches a certain minimum or falls below it, in which case the direct control of the drive device by the second input control signal remains possible.

8. A device according to claim 3, wherein the control unit is configured to receive at least one sensor signal upon having performed collision monitoring, the sensor signal respectively indicating a position of a component of the surgical table, a change of position of a component of the surgical table, or both a position and a change of position of a component of the surgical table, wherein the component of the surgical table that can be moved by the drive device.

9. A device according to claim 1, wherein the second locking unit is switched to the first switch position after the powering up of the device, and remains in this first switch position even in the event of a malfunction of the control unit.

10. A device according to claim 1, wherein the first input control signal can be supplied to the device via a first control unit that can be connected with the device, and that the second input control signal can be supplied to the device via a second control unit that can be connected with the device.

11. A device according to claim 1, wherein the device is configured such that the second input control signal has priority over the first input control signal.

12. A method for controlling at least one drive device of a surgical table with a control unit and a safety release unit, wherein the control unit is configured to drive the drive device based upon the receipt at least two control signals, the at least two control signals are derived from different sources, wherein the at least two control signals comprises a first input control signal and a second input control signal, wherein the safety release unit comprises a first locking unit for locking the first input control signal in response to a locking signal generated by the control unit and a second locking unit for locking the second input control signal, the method comprising the steps of:

receiving at the control unit the first input control signal or the second input control signal;

controlling with the control unit the operation of the at least one drive device of the surgical table as a result of the receipt of the first input control signal or a signal based at least in part from the second input control signal;

forwarding with the second locking unit of the safety release unit the second input control signal to the drive device in a first switching state; and interrupting with the second locking unit of the safety release unit the forwarding of the second input control signal in a second switching state, wherein the second locking unit is switched to the first switching state after the powering up of the device.

13. The method of claim 12, wherein the step of receiving involves receiving the first and second input control signals from different sources.

14. The method of claim 12, further comprising:

performing collision monitoring based on the first input control signal and on the second input control signal, respectively, for a collision between a component of the surgical table that may be moved by the drive device and another component of the surgical table or the surroundings of the component of the surgical table.

15. The method of claim 14, further comprising:

generating at least a first warning signal upon having performed collision monitoring, if upon the actuation of the drive device, the distance between a component of the surgical table that can be moved by the drive device and another component of the surgical table or the surroundings of the component of the surgical table reaches a certain minimum or falls below it.

16. The method of claim 14, further comprising:

checking while performing collision monitoring whether a change of position of the component of the surgical table that can be moved by the drive device relative to a position of the other component of the surgical table is permitted, and depending on the result, generating at least a first warning signal.

17. The method of claim 16, wherein the first warning signal is an optical or an acoustic warning signal.

* * * * *